Inventor
John Samson

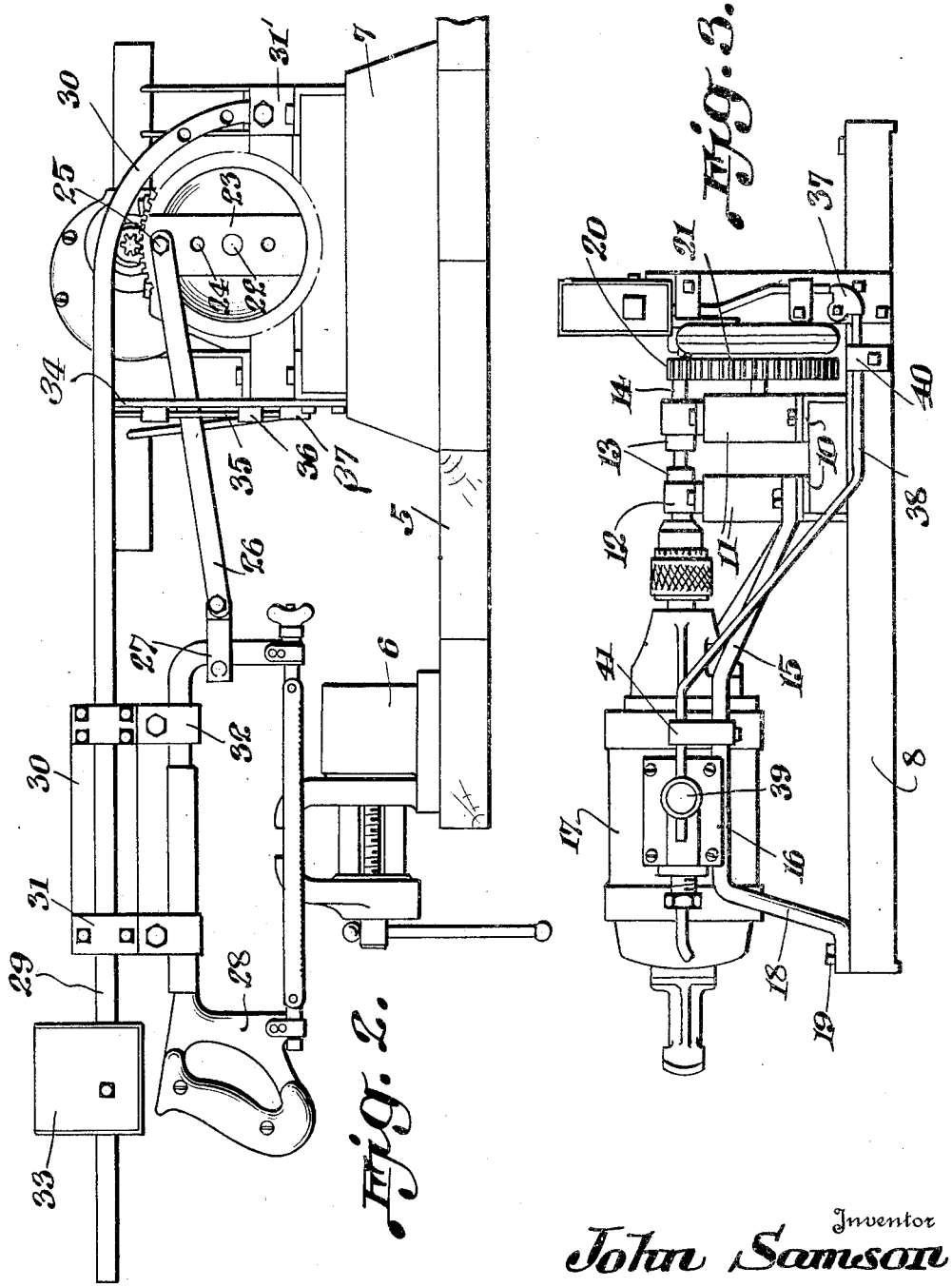

Patented Dec. 8, 1931

1,835,432

UNITED STATES PATENT OFFICE

JOHN SAMSON, OF BOZEMAN, MONTANA

POWER SAW

Application filed June 30, 1930. Serial No. 464,919.

This invention relates to power driven saws, and aims to provide novel means whereby the usual power drill may be readily and easily converted into a power unit for operating hack saws.

An important object of the invention is to provide means for guiding the saw in its movements, and feeding the saw to its work, novel means being provided for automatically operating the switch that controls the electric current passing to the motor of the drill, to cut off the electric current when the saw has completed its work.

A still further object of the invention is to provide a device of this character including a swinging arm for supporting the saw, so that the arm and saw may be swung to a vertical position clear of the vise, so that the vise may be used for purposes other than a work support for metal saws.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a side elevational view thereof.

Figure 3 is an end elevational view of the device.

Figure 1:
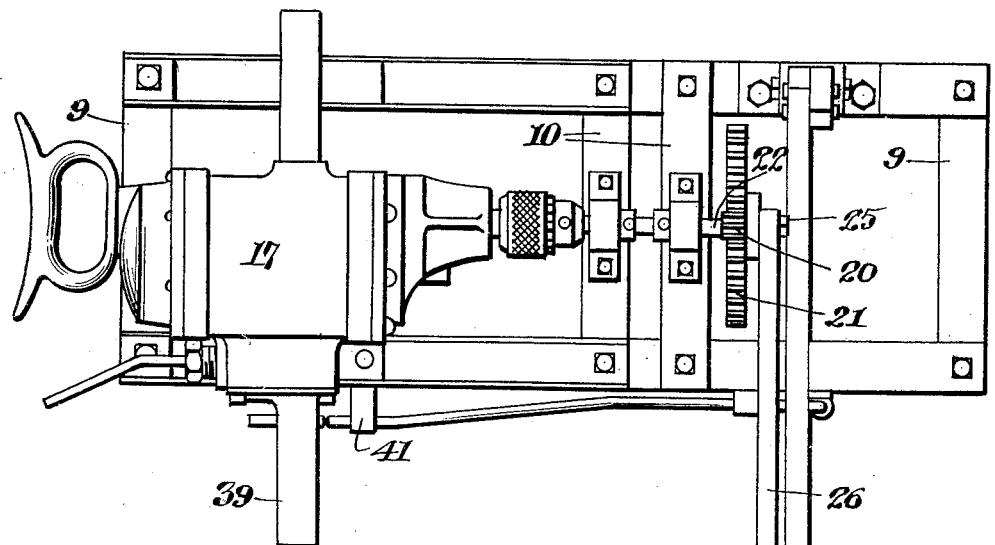
Figure 1 is a plan view of a device constructed in accordance with the invention.
Figure 1:
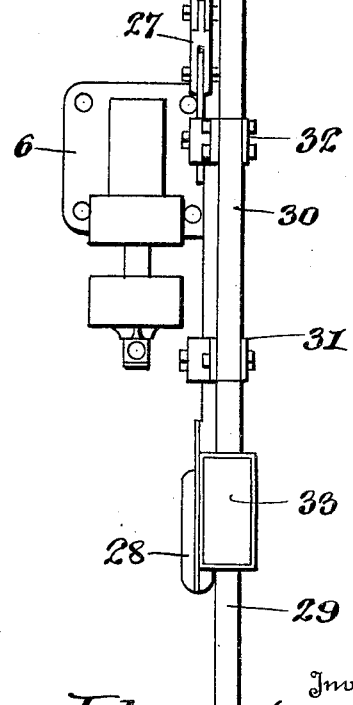

Referring to the drawings in detail, the device is shown as mounted on a work bench indicated by the reference character 5, and on which the usual vise 6, is mounted.

The device forming the essence of the invention, comprises a base 7 on which the bars 8 are mounted, the bars 8 being connected at their ends by means of the bars 9. Bars 10 also connect the bars 8, and provide supports for the blocks 11, the blocks 11 being provided with straps 12 at their upper ends, which straps support the bearings 13 in which the drill shaft 14 operates.

Bars 15 have their forward ends connected to one of the bars 10, at points adjacent to the ends thereof, the bars 15 being extended upwardly and laterally providing arms 16 on which the body portion of the drill, indicated by the reference character 17, is mounted. The rear ends of the bars 15 extend downwardly at 18, where they are secured to the bars 8 by means of bolts 19.

At the free end of the shaft 14, is a pinion 20 that meshes with the main gear 21, to transmit rotary motion thereto, the main gear being mounted on the shaft 22 supported in bearings mounted in the block 11 disposed adjacent thereto.

Secured to the gear 21, is a crank block 23 which is formed with spaced openings 24 for the reception of the pin 25, so that the position of the pin on the crank block may be changed to meet various requirements. The reference character 26 designates the connecting rod which is connected with the crank block 23, by the pin 25. Pivotally connected with the connecting rod 26, is a clamp 27 that connects with the forward end of the hack saw, which is indicated by the reference character 28.

Forming a part of the device is a guide arm 29 that has a curved forward end 30 pivotally connected at its lower end, with the block 31', so that the arm may swing from its horizontal position as shown by Figure 2 of the drawings, to a vertical position so that the vise that supports the work during the sawing operation, may be free for use for other purposes.

Slidably mounted on the arm 29 is the guide block assembly indicated generally by the reference character 30 and includes end members 31 that have clamps 32 to be clamped around the upper bar of the hack saw operated by the device.

The reference character 33 designates a weight that is adjustably mounted on the guide arm 29, the weight being designed to normally urge the guide arm and hack saw supported thereby, downwardly to force the hack saw through its work.

Mounted at one side of the base, and extending upwardly therefrom, is a bar 34, the upper end thereof being disposed at a point so that it acts as a rest for the guide arm 29 to prevent the guide arm and saw supported thereby from dropping, after it has passed through the work.

Supported by the bar 34, is a vertically sliding rod 35 mounted in the guides 36, the lower end of the rod 35 resting against the quadrant block 37, the quadrant block also engaging the rod 38 that extends upwardly to operate the switch 39 that controls the electric circuit to the motor of the drill 17. This rod 38 operates through the guides 40 and 41. As the guide arm 29 moves downwardly, the upper end of the rod 35 is engaged by the guide arm, causing the rod 35 to move downwardly, operating the rod 38 to control the switch to stop the motor.

From the foregoing it will be obvious that due to the construction shown and described, the usual electric drill may be utilized as a power unit for operating gearing to transmit motion to a hack saw, the operation of the device being automatically controlled.

I claim:

A power saw comprising a frame, a motor mounted on the frame, a guide arm pivotally mounted on the frame and extending laterally therefrom, guide blocks mounted on the guide arm, a saw connected with the guide blocks, means for transmitting movement of the motor to the saw, a switch member disposed adjacent to the motor for controlling the electric circuit to the motor, a rod extending into the switch and mounted for sliding movement on the frame, a vertically sliding rod, a quadrant block disposed between the adjacent ends of the rods, said guide arm adapted to engage the vertically sliding rod to move the vertically sliding rod downwardly to operate the first mentioned rod and switch when the saw moves through its work, and means for urging the guide arm downwardly.

In testimony that I claim the foregoing as my own, I have hereto affixed my signature.

JOHN SAMSON.